US009562175B2

(12) United States Patent
Asay et al.

(10) Patent No.: US 9,562,175 B2
(45) Date of Patent: *Feb. 7, 2017

(54) ADHESIVE COMPOSITIONS CONTAINING GRAPHENIC CARBON PARTICLES

(71) Applicant: PPG Industries Ohio, Inc., Cleveland, OH (US)

(72) Inventors: David B. Asay, Freeport, PA (US); Tien-Chieh Chao, Mars, PA (US); Umesh C. Desai, Wexford, PA (US); Cheng-Hung Hung, Wexford, PA (US); Masayuki Nakajima, Wesford, PA (US); Noel R. Vanier, Wesford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,920

(22) Filed: Jun. 24, 2014

(65) Prior Publication Data

US 2014/0299270 A1 Oct. 9, 2014

Related U.S. Application Data

(63) Continuation of application No. 13/463,105, filed on May 3, 2012, now Pat. No. 8,796,361, which is a (Continued)

(51) Int. Cl.
*C09J 11/04* (2006.01)
*B82Y 30/00* (2011.01)
(Continued)

(52) U.S. Cl.
CPC ............. *C09J 11/04* (2013.01); *B82Y 30/00* (2013.01); *C08G 59/4215* (2013.01); *C09J 5/00* (2013.01); *C09J 163/00* (2013.01); *C08K 3/04* (2013.01)

(58) Field of Classification Search
CPC ....... B82Y 30/00; C08G 59/4215; C08K 3/04; C09J 11/04; C09J 163/00; C09J 5/00; C09D 201/00
See application file for complete search history.

(56) References Cited

U.S. PATENT DOCUMENTS 3,860,541 A 1/1975 Lehmann et al.
3,985,825 A 10/1976 Schmid et al.
(Continued)

FOREIGN PATENT DOCUMENTS

CN 101550325 7/2009
EP 2518103 10/2012
(Continued)

OTHER PUBLICATIONS

WO 2010059505 A1, May 2010, Derwent Ab.*
(Continued)

*Primary Examiner* — Satya Sastri
(74) *Attorney, Agent, or Firm* — Charles M. Yeomans

(57) ABSTRACT

Disclosed herein are adhesive compositions comprising (a) a first component; (b) a second component that chemically reacts with said first component; and (c) graphenic carbon particles having an oxygen content of no more than 2 atomic weight percent. Disclosed herein are associated methods for forming the adhesive compositions and applying the adhesive compositions to a substrate to form a bonded substrate.

22 Claims, 2 Drawing Sheets

Related U.S. Application Data continuation-in-part of application No. 13/315,518, filed on Dec. 9, 2011, which is a continuation-in-part of application No. 12/949,878, filed on Nov. 19, 2010.

(51) Int. Cl.

| | |
|---|---|
| *C09J 5/00* | (2006.01) |
| *C08G 59/42* | (2006.01) |
| *C09J 163/00* | (2006.01) |
| *C08K 3/04* | (2006.01) |

(56) References Cited

U.S. PATENT DOCUMENTS

| | | |
|---|---|---|
| 4,032,593 A | 6/1977 | Samejima |
| 4,091,001 A | 5/1978 | Berger |
| 4,107,116 A | 8/1978 | Riew et al. |
| 4,129,607 A | 12/1978 | Kooi et al. |
| 4,304,694 A | 12/1981 | Scola et al. |
| 4,668,736 A | 5/1987 | Robins et al. |
| 4,851,262 A | 7/1989 | McFeaters |
| 4,990,576 A | 2/1991 | Cuscurida et al. |
| 5,426,169 A | 6/1995 | Starner |
| 5,486,675 A | 1/1996 | Taylor et al. |
| 5,527,518 A | 6/1996 | Lynum et al. |
| 5,749,937 A | 5/1998 | Detering et al. |
| 5,788,738 A | 8/1998 | Pirzada et al. |
| 5,851,507 A | 12/1998 | Pirzada et al. |
| 5,935,293 A | 8/1999 | Detering et al. |
| 5,984,997 A | 11/1999 | Bickmore et al. |
| 5,989,648 A | 11/1999 | Phillips |
| 6,099,696 A | 8/2000 | Schwob et al. |
| 6,228,904 B1 | 5/2001 | Yadav et al. |
| 6,248,204 B1 | 6/2001 | Schuft |
| 6,358,375 B1 | 3/2002 | Schwob |
| RE37,853 E | 9/2002 | Detering et al. |
| 6,482,899 B2 * | 11/2002 | Ohashi et al. .............. 525/486 |
| 6,645,341 B1 | 11/2003 | Gordon |
| 6,652,967 B2 | 11/2003 | Yadav et al. |
| 6,669,823 B1 | 12/2003 | Sarkas et al. |
| 6,689,192 B1 | 2/2004 | Phillips et al. |
| 6,710,116 B1 | 3/2004 | Waddell et al. |
| 6,716,525 B1 | 4/2004 | Yadav et al. |
| 6,719,821 B2 | 4/2004 | Yadav et al. |
| 6,786,950 B2 | 9/2004 | Yadav et al. |
| 6,821,500 B2 | 11/2004 | Fincke et al. |
| 6,830,822 B2 | 12/2004 | Yadav et al. |
| 6,849,109 B2 | 2/2005 | Yadav et al. |
| 7,071,258 B1 | 7/2006 | Jang et al. |
| 7,071,263 B2 | 7/2006 | Cheng et al. |
| 7,511,097 B2 | 3/2009 | Frick et al. |
| 7,547,373 B2 | 6/2009 | Hachikian |
| 7,635,458 B1 | 12/2009 | Hung et al. |
| 7,745,528 B2 | 6/2010 | Prud'Homme et al. |
| 7,754,184 B2 | 7/2010 | Mercuri |
| 7,776,303 B2 | 8/2010 | Hung et al. |
| 7,785,492 B1 | 8/2010 | Jang et al. |
| 7,790,285 B2 | 9/2010 | Zhamu et al. |
| 7,824,741 B2 | 11/2010 | Sandhu |
| 7,842,271 B2 | 11/2010 | Petrik |
| 8,047,248 B2 | 11/2011 | Prud'homme et al. |
| 8,486,363 B2 | 7/2013 | Hung et al. |
| 8,486,364 B2 | 7/2013 | Vanier et al. |
| 8,796,361 B2 * | 8/2014 | Asay et al. ................. 523/468 |
| 8,968,695 B2 * | 3/2015 | Kwon et al. ................ 423/448 |
| 2002/0114949 A1 | 8/2002 | Bower et al. |
| 2004/0072927 A1 | 4/2004 | Hachikian |
| 2004/0176550 A1 | 9/2004 | McQuaid |
| 2005/0271574 A1 | 12/2005 | Jang et al. |
| 2006/0093885 A1 | 5/2006 | Krusic et al. |
| 2006/0121279 A1 | 6/2006 | Petrik |
| 2006/0216222 A1 | 9/2006 | Jang |
| 2006/0225615 A1 | 10/2006 | Raman et al. |
| 2006/0252891 A1 | 11/2006 | McQuaid |
| 2007/0045116 A1 | 3/2007 | Hung et al. |
| 2007/0065703 A1 * | 3/2007 | Abd Elhamid et al. ........ 429/34 |
| 2007/0191556 A1 | 8/2007 | Eger |
| 2008/0103340 A1 | 5/2008 | Binder et al. |
| 2008/0206124 A1 | 8/2008 | Jang et al. |
| 2008/0220282 A1 * | 9/2008 | Jang et al. .................. 428/689 |
| 2008/0251202 A1 | 10/2008 | Eagle et al. |
| 2009/0022649 A1 | 1/2009 | Zhamu et al. |
| 2009/0048370 A1 | 2/2009 | Lutz et al. |
| 2009/0068471 A1 | 3/2009 | Choi et al. |
| 2009/0075035 A1 | 3/2009 | O'Brien et al. |
| 2009/0110627 A1 | 4/2009 | Choi et al. |
| 2009/0169467 A1 | 7/2009 | Zhamu et al. |
| 2009/0308534 A1 | 12/2009 | Malone |
| 2010/0036023 A1 | 2/2010 | Weng et al. |
| 2010/0047154 A1 | 2/2010 | Lee et al. |
| 2010/0055017 A1 | 3/2010 | Vanier et al. |
| 2010/0055025 A1 | 3/2010 | Jang et al. |
| 2010/0072430 A1 | 3/2010 | Gergely et al. |
| 2010/0096597 A1 | 4/2010 | Prud'Homme et al. |
| 2010/0104832 A1 | 4/2010 | Messe et al. |
| 2010/0105834 A1 * | 4/2010 | Tour .................... B82Y 30/00 525/50 |
| 2010/0126660 A1 | 5/2010 | O'Hara |
| 2010/0247801 A1 | 9/2010 | Zenasni |
| 2010/0255219 A1 | 10/2010 | Wenxu et al. |
| 2010/0276645 A1 | 11/2010 | Aspin et al. |
| 2010/0280191 A1 | 11/2010 | Dixit et al. |
| 2010/0301212 A1 | 12/2010 | Dato et al. |
| 2010/0303706 A1 | 12/2010 | Wallace et al. |
| 2010/0314788 A1 | 12/2010 | Hung et al. |
| 2010/0323113 A1 | 12/2010 | Ramappa et al. |
| 2011/0046289 A1 | 2/2011 | Zhamu et al. |
| 2011/0070426 A1 | 3/2011 | Vanier et al. |
| 2011/0076391 A1 | 3/2011 | Gross et al. |
| 2011/0233452 A1 | 9/2011 | Kim et al. |
| 2012/0095133 A1 * | 4/2012 | Vyakaranam et al. ........ 523/435 |
| 2012/0128499 A1 | 5/2012 | Desai et al. |
| 2012/0129980 A1 | 5/2012 | Desai et al. |
| 2012/0211160 A1 | 8/2012 | Asay et al. |
| 2013/0084236 A1 | 4/2013 | Hung et al. |
| 2013/0084237 A1 | 4/2013 | Vanier et al. |
| 2013/0150516 A1 | 6/2013 | Lettow |

FOREIGN PATENT DOCUMENTS

| | | | |
|---|---|---|---|
| JP | 59068990 A | 4/1984 | |
| JP | 09235354 A | 9/1997 | |
| JP | 200608730 | 12/2006 | |
| KR | 20040061909 A | 7/2004 | |
| RU | 2162480 C2 | 1/2001 | |
| SU | 176393 A1 | 12/1965 | |
| WO | 9801495 | 1/1998 | |
| WO | 2004099317 | 11/2004 | |
| WO | 2009134492 A3 | 11/2009 | |
| WO | WO 2010059505 A1 * | 5/2010 | ............ B82Y 30/00 |
| WO | 2010077769 A3 | 9/2010 | |
| WO | WO 2011005925 A1 * | 1/2011 | ............ C08L 63/00 |
| WO | 2011012874 A1 | 2/2011 | |
| WO | WO 2011019095 A1 * | 2/2011 | |
| WO | 2013049498 A1 | 4/2013 | |

OTHER PUBLICATIONS

Cassagneau, Thierry et al., "Preparation and Layer-by-Layer Self-Assembly of Silver Nanoparticles Capped by Graphite Oxide Nanosheets", J. Phys. Chem. B, Feb. 25, 1999; pp. 1789-1793, 103, American Chemical Society.

Coraux, Johann et al., "Growth of graphene on Ir(111)", New Journal of Physics, Feb. 4, 2009; pp. 1-22, 11023066, IOP Publishing Ltd and Deutsche Physikalische Gesellschaft.

Dato, Albert et al., "Substrate-Free Gas-Phase Synthesis of Graphene Sheets", Nano Letters, Jun. 5, 2008; pp. 2012-2016, vol. 8, No. 7, American Chemical Society.

Dresselhaus, M.S. et al., "Structure of Fullerenes", "Science of Fullerenes and Carbon Nanotubes", 1996, pp. 60-79, Chapter 3, Academic Press, Inc., San Diego, California, United States of America.

(56) References Cited

OTHER PUBLICATIONS

Du, X.S. et al., "Facile synthesis of highly conductive polyaniline/graphite nanocomposites", European Polymer Journal, Mar. 20, 2004; pp. 1489-1493, vol. 40, Elsevier Ltd.

Fincke, et al., "Plasma Pyrolysis of Methane to Hydrogen and Carbon Black", Ind. Eng. Chem. Res. 41 (2002), pp. 1425-1435.

Fitzer, E. et al., "Recommended Terminology for the Description of Carbon as a Solid", Pure and Applied Chemistry, 95, pp. 473-506, vol. 67, No. 3.

Gomez De Arco, Lewis et al., "Synthesis, Transfer, and Devices of Single- and Few-Layer Graphene by Chemicai Vapor Deposition", IEEE Transactions on Nanotechnology, Mar. 6, 2009; pp. 135-138, vol. 8, No. 2.

Gonzalez-Aguilar, et al., "Carbon Nanostructures Production by Gas-Phase Plasma Processes at Atmospheric Pressure", J. Phys. D: Appl. Phys. 40 (2007), pp. 2361-2374.

Holmen, A. et al., "High-Temperature Pyrolysis of Hydrocarbons. 1. Methane to Acetylene", Ind. Eng. Chem., Process Des. Dev., 1976, pp. 439-444, vol. 15, No. 3.

Khan, M. S. et al., "Survey of Recent Methane Pyrolysis Literature", Industrial and Engineering Chemistry, Oct. 1970; pp. 54-59, vol. 62, No. 10.

Kim, Juhan et al., "Fabrication of graphene flakes composed of multi-layer graphene sheets using a thermal plasma jet system". Nanotechnology, Jan. 29, 2010; pp. 1-6, vol. 21 095601, IOP Publishing Ltd.

"Acetylene From Hydrocarbons", Kirk-Othmer Encyclopedia of Chemical Technology, pp. 1-28, John Wiley & Sons, Inc.

Kostic, Zivota G. et al., "Thermodynamic Consideration of B-O-C-H System for Boron Carbide (B4C) Powder Synthesis in Thermal Plasma", The VINCA Institute of Nuclear Sciences, pp. 889-898.

Malesevic, et al., "Synthesis of Few-Layer Graphene Via Microwave Plasma-Enhanced Chemical Vapour 15 Deposition", Nanotechnology 19 (2008), 305604, 6pp.

McWilliams, Andrew, "Market Research Report—Graphene: Technologies, Applications, and Markets—AVM075A", pp. 1-26, BCC Research, Wellesley, Massachusetts, 02481, United States of America.

Nandamuri G. et al., "Chemical vapor despositon of graphene films", Nanotechnology, Mar. 10, 2010; pp. 1-4. vol. 21 145604, IOP Publishing Ltd.

Pham et al., Epoxy Resins, Encyclopedia of Polymer Science and Technology, Jan. 1, 2004; pp. 678-804, vol. 9, John Wiley & Sons, Inc.

Pristavita, Ramona et al., "Carbon Blacks Produced by Thermal Plasma; the Influence of the Reactor Geometry on the Product Morphology", Plasma Chem Plasma Process, Feb. 21, 2010; pp. 267-279, vol. 30, Springer.

Pristavita, Ramona et al., "Carbon Nano-Flakes Produced by an Inductively Coupled Thermal Plasma System for Catalyst Applications", Plasma Chem Plasma Process, Feb. 16, 2011; pp. 393-403, vol. 31, Springer.

Pristavita, Ramona et al., "Carbon Nanoparticle Production by Inductively Coupled Thermal Plasmas: Controlling the Thermal History of Particle Nucleation", Plasma Chem Plasma Process, Sep. 21, 2011; Springer.

Rafiee Mohammad A. et al., "Enhanced Mechanical Properties of Nanocomposites at Low Graphene Content", ACS NANO; Dec. 22, 2009, pp. 3884-3890; vol. 3, No. 12; American Chemical Society.

Ratna, D. et al., "Shock-resistant ambient temperature curing epoxy adhesive", J. Adhesion Sci. Technol., 2003, pp. 623-632, vol. 17, No. 5, VSP.

Skinner, Gordon B., "Pyrolysis of Methane and the C2 Hydrocarbons", Monsanto Chemical Co., pp. 59-68, Dayton, Ohio, United States of America.

Song, et al., "Properties of Styrene-Butadiene Rubber Nanocomposites Reinforced with Carbon Black, Carbon Nanotube, Graphene, Graphite," Kor. J. Mater. Res., vol. 20 (2010), No. 2, pp. 104-110.

Subrahmanyam K. S. et al., "Simple Method of Preparing Graphene Flakes by an Arc-Discharge Method", The Journal of Physical Chemistry C Letters, Feb. 20, 2009; pp. 4257-4259, vol. 113, No. 11, American Chemical Society.

Tang, Ben Zhong et al., "Processible Nanostructured Materials with Electrical Conductivity and Magnetic Susceptibility: Preparation and Properties of Maghemite/Polyanililne Nanocomposite Films", Chem. Mater., May 7, 1999; pp. 1581-1589, vol. 11, No. 6, American Chemical Society.

Zhong, Ziyi et al., "Catalytic growth of carbon nanoballs with and without cobalt encapsulation", Chemical Physics Letters. Nov. 3, 2000; pp. 41-47, vol. 330, Elsevier Science B.V.

www.strem.com/uploads/resources/documents/graphene_nanoplatelets.pdf, Apr. 2013.

Lavoie, Martin "Synthesis of Carbon Black From Propane Using a Thermal Plasma", Master's Thesis in Applied Sciences, University of Sherbrooke, Faculty of Applied Sciences, Department of Chemical Engineering, Quebec, Canada, Sep. 1997.

Bergeron, Emmanuel "Production of Carbon by Pyrolysis of Methane in Thermal Plasma", Master's Thesis in Applied Sciences, University of Sherbrooke, Faculty of Applied Sciences, Department of Chemical Engineering, Quebec, Canada, Oct. 1997.

Kim, Keun Su et al. "Continuous Synthesis of Nanostructured Sheetlike Carbons by Thermal Plasma Decomposition of Methane", IEEE Transactions on Plasma Science, vol. 35, No. 2, Apr. 2007.

* cited by examiner

ADHESIVE COMPOSITIONS CONTAINING GRAPHENIC CARBON PARTICLES

CROSS-REFERENCE TO RELATED APPLICATIONS

This is a continuation of U.S. patent application Ser. No. 13/463,105, filed May 3, 2012, entitled "Adhesive Compositions Containing Graphenic Carbon Particles," which is a continuation-in-part of U.S. patent application Ser. No. 13/315,518, filed Dec. 9, 2011, entitled "Structural Adhesive Compositions", which is a continuation-in-part of U.S. patent application Ser. No. 12/949,878, filed Nov. 19, 2010 and entitled "Structural Adhesive Compositions."

FIELD OF THE INVENTION

The present invention relates to adhesive compositions and more particularly to 1K and 2K adhesive compositions.

BACKGROUND INFORMATION

Adhesives are utilized in a wide variety of applications to bond together two or more substrate materials. For example, adhesives may be used for bonding together wind turbine blades or bonding together automotive structural components.

The present invention is directed towards one-component (1K) and two-component (2K) adhesive compositions that provide sufficient bond strength, are easy to apply, and, where applicable, have sufficiently long pot lives for use in bonding together substrate materials.

SUMMARY OF THE INVENTION

One embodiment of the present invention discloses a composition comprising (a) a first component; (b) a second component that chemically reacts with the first component; and (c) graphenic carbon particles having an oxygen content of no more than 2 atomic weight percent.

DETAILED DESCRIPTION

Figure 1:
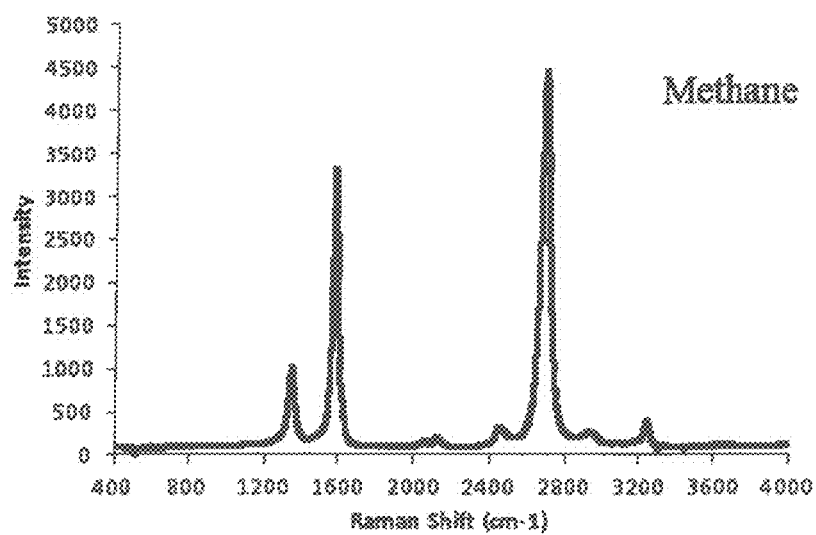
FIG. 1 is a plot of Raman shift versus intensity for a sample of material according to Example A.

For purposes of the following detailed description, it is to be understood that the invention may assume various alternative variations and step sequences except where expressly specified to the contrary. Moreover, other than in any operating examples, or where otherwise indicated, all numbers expressing, for example, quantities of ingredients used in the specification and claims, are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of or means "and/or" unless specifically stated otherwise, even though "and/or" may be explicitly used in certain instances.

As used herein, the term "curing" refers to the toughening or hardening of a polymer material by cross-linking of polymer chains.

As noted above, in general, the present invention discloses 1K ("One-Component", or "One Part") and 2K ("Two-Component", or "Two Part") adhesive compositions that are used to bond together two substrate materials for a wide variety of potential applications in which the bond between the substrate materials may provide particular mechanical properties related to elongation, tensile strength, lap shear strength, T-peel strength, modulus, or impact peel strength. The adhesive is applied to either one or both of the materials being bonded. The pieces are aligned and pressure and spacers may be added to control bond thickness.

As defined herein, a "1K" adhesive composition, is a composition in which all of the ingredients may be premixed and stored and wherein the reactive components do not readily react at ambient or slightly thermal conditions, but instead only react upon activation by an external energy source (such as by thermal means or by actinic radiation). By contrast, a 2K adhesive composition is a composition in which the reactive components readily react and cure without activation from an external energy source, such as at ambient or slightly thermal conditions. As further defined herein, ambient conditions generally refer to room temperature and humidity conditions or temperature and humidity conditions that are typically found in the area in which the adhesive is being applied to a substrate, while slightly thermal conditions are temperatures that are slightly above ambient temperature but are generally below the curing temperature for the adhesive composition (i.e. in other words, at temperatures and humidity conditions below which the reactive components will readily react and cure).

Relatedly, the present invention also provides a method for forming these 1K and 2K adhesive compositions, and also provides a method for improving the rheology and other features of these 1K and 2K adhesive compositions.

Suitable substrate materials that may be bonded by the adhesive compositions include, but are not limited to, materials such as, metals or metal alloys, natural materials such as wood, polymeric materials such as hard plastics, or composite materials. The adhesives of the present invention are particularly suitable for use in various automotive applications and for use in wind turbine technology.

2K Adhesives

The 2K adhesives of the present invention are formed from two chemical components, namely, (a) a first component and (b) a second component which are mixed just prior to application. For 2K adhesives, the curing between the first component (a) and the second component (b) to form the crosslinked final product occurs immediately upon mixing at ambient or slightly thermal temperatures (i.e. without the need for an external energy source such as an oven or actinic radiation source).

The first component (a), in certain embodiments, comprises one or more epoxy compound and/or epoxy-adducts. The second component (b), in certain embodiments, comprises a curing component that reacts with the first component to form a bond (i.e. it crosslinks with the first component, typically through the epoxy groups) that provides the substrate to which it is applied with desirable bonding characteristics. In certain embodiments, the curing component is an amine compound, although other curing components such as thiol-functional (—SH) compounds may alternatively be utilized.

The equivalent ratio of amine to epoxy in the adhesive composition may vary from about 0.5:1 to about 1.5:1, such as from 1.0:1 to 1.25:1. In certain embodiments, the equivalent ratio of amine to epoxy is slightly above 1:1. As described herein, the equivalents of epoxy used in calculating the equivalent ratio of epoxy are based on the epoxy equivalent weight of the first component, and the equivalents of amine used in calculating the equivalent ratio of amine are based on the amine hydrogen equivalent weight (AHEW) of the second component.

Suitable epoxy compounds that may be used as the first component include polyepoxides. Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting first epoxy compounds include epoxidized Bisphenol A novolacs, epoxidized phenolic novolacs, epoxidized cresylic novolac, and triglycidyl p-aminophenol bismaleimide.

In one embodiment, the epoxy-adduct is formed as the reaction product of reactants comprising a first epoxy compound, a polyol, and an anhydride. In another embodiment, the epoxy-adduct is formed as the reaction product of reactants comprising a first epoxy compound, a polyol, and a diacid. In still another embodiment, the epoxy-adduct is formed as the reaction product of reactants comprising a first epoxy compound, a polyol, an anhydride, and a diacid. In these embodiments, the epoxy-adduct comprises from 3 to 50 weight percent such as from 3 to 25 weight percent of the first component.

Useful first epoxy compounds that can be used to form the epoxy-adduct include polyepoxides. Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting first epoxy compounds include epoxidized Bisphenol A novolacs, epoxidized phenolic novolacs, epoxidized cresylic novolac, and triglycidyl p-aminophenol bismaleimide.

Useful polyols that may be used to form the epoxy-adduct include diols, trials, tetraols and higher functional polyols. The polyols can be based on a polyether chain derived from ethylene glycol, propylene glycol, butylenes glycol, hexylene glycol and the like and mixtures thereof. The polyol can also be based on a polyester chain derived from ring opening polymerization of caprolactone. Suitable polyols may also include polyether polyol, polyurethane polyol, polyurea polyol, acrylic polyol, polyester polyol, polybutadiene polyol, hydrogenated polybutadiene polyol, polycarbonate polyols, polysiloxane polyol, and combinations thereof. Polyamines corresponding to polyols can also be used, and in this case, amides instead of carboxylic esters will be formed with acids and anhydrides.

Suitable diols that may be utilized to form the epoxy-adduct are diols having a hydroxyl equivalent weight of between 30 and 1000. Exemplary diols having a hydroxyl equivalent weight from 30 to 1000 include diols sold under the trade name Terathane®, including Terathane® 250, available from Invista. Other exemplary diols having a hydroxyl equivalent weight from 30 to 1000 include ethylene glycol and its polyether diols, propylene glycol and its polyether diols, butylenes glycol and its polyether diols, hexylene glycols and its polyether diols, polyester diols synthesized by ring opening polymerization of caprolactone, and urethane diols synthesized by reaction of cyclic carbonates with diamines. Combination of these diols and polyether diols derived from combination various diols described above could also be used. Dimer diols may also be used including those sold under trade names Pripol® and Solvermol™ available from Cognis Corporation.

Polytetrahydrofuran-based polyols sold under the trade name Terathane®, including Terathane® 650, available from Invista, may be used. In addition, polyols based on dimer diols sold under the trade names Pripol® and Empol®, available from Cognis Corporation, or bio-based polyols, such as the tetrafunctional polyol Agrol 4.0, available from BioBased Technologies, may also be utilized.

Useful anhydride compounds to functionalize the polyol with acid groups include hexahydrophthalic anhydride and its derivatives (e.g. methyl hexahydrophthalic anhydride); phthalic anhydride and its derivatives (e.g. methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexamfluoroisopropylidene) anhydride (6FDA). Useful diacid compounds to functionalize the polyol with acid groups include phthalic acid and its derivates (e.g. methyl phthalic acid), hexahydrophthalic acid and its derivatives (e.g. methyl hexahydrophthalic acid), maleic acid, succinic acid, adipic acid, etc. Any diacid and anhydride can be used; however, anhydrides are preferred.

In one embodiment, the polyol comprises a diol, the anhydride and/or diacid comprises a monoanhydride or a diacid, and the first epoxy compound comprises a diepoxy compound, wherein the mole ratio of diol, monoanhydride (or a diacid), and diepoxy compounds in the epoxy-adduct may vary from 0.5:0.8:1.0 to 0.5:1.0:6.0.

In another embodiment, the polyol comprises a diol, the anhydride and/or diacid comprises a monoanhydride or a diacid, and the first epoxy compound comprises a diepoxy compound, wherein the mole ratio of diol, monoanhydride (or a diacid), and diepoxy compounds in the epoxy-adduct may vary from 0.5:0.8:0.6 to 0.5:1.0:6.0.

In another embodiment, a second epoxy compound of the first component (a), wherein the first component (a) includes at least two epoxy compounds, is a diepoxide compound that has an epoxy equivalent weight of between about 150 and about 1000. Suitable diepoxides having an epoxy equivalent weight of between about 150 and about 1000 include polyglycidyl ethers of Bisphenol A, such as Epon® 828 and 1001 epoxy resins, and Bisphenol F diepoxides, such as Epon® 862, which are commercially available from Hexion Specialty Chemicals, Inc.

In another embodiment, the second epoxy compound of the first component (a) is a diepoxide compound or a higher functional epoxide (collectively, a "polyepoxide"), including polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins.

Still other non-limiting second epoxy compounds include epoxidized Bisphenol A novolacs, epoxidized phenolic novolacs, epoxidized cresylic novolac, and triglycidyl p-aminophenol bismaleimide.

In another embodiment, the second epoxy compound of the first component (a) comprises an epoxy-dimer acid adduct. The epoxy-dimer acid adduct may be formed as the reaction product of reactants comprising a diepoxide compound (such as a Bisphenol A epoxy compound) and a dimer acid (such as a C36 dimer acid).

In another embodiment, the second epoxy compound of the first component (a) comprises a carboxyl-terminated butadiene-acrylonitrile copolymer modified epoxy compound.

Useful amine compounds that may be used include primary amines, secondary amines, tertiary amines, and combinations thereof. Useful amine compounds that can be used include diamines, triamines, tetramines, and higher functional polyamines.

Suitable primary amines include alkyl diamines such as 1,2-diaminoethane, 1,3-diaminopropane, 1,4-diaminobutane, neopentyldiamine, 1,8-diaminooctane, 1,10-diaminodecane, 1,-12-diaminododecane and the like; 1,5-diamino-3-oxapentane, diethylene-triamine, triethylenetetramine, tetraethylenepentamine and the like; cycloaliphatic diamines such as 1,2-bis(aminomethyl)cyclohexane, 1,3-bis(aminomethyl)cyclohexane, 1,4-bis(aminomethyl)cyclohexane, bis(aminomethyl)norbornane and the like; aromatic alkyl diamines such as 1,3-bis(aminomethyl)benzene (m-xylene diamine) and 1,4-bis(aminomethyl)benzene (p-xylenediamine) and their reaction products with epichlorohydrin such as Gaskamine 328 and the like; amine-terminated polyethyleneglycol such as Huntsman Corporation Jeffamine ED series and amine-terminated polypropylene glycol such as Huntsman Corporation Jeffamine D series; and amine-terminated polytetrahydrofurane such as Huntsman Jeffamine EDR series. Primary amines having functionality higher than 2 include, for example, the Jeffamine T series, available from Huntsman Corporation, which are amine-terminated propoxylated trimethylolpropane or glycerol and aminated propoxylated pentaerythritols.

Still other amines that may be utilized include isophorone diamine, methenediamine, 4,8-diamino-tricyclio[5.2.1.0]decane and N-aminoethylpiperazine.

In certain embodiments, the amine compounds comprise triethylenetetramine (TETA), isophorone diamine, 1,3 bis(aminomethyl)cyclohexane, and polypropylene oxide-based polyetheramines.

In certain embodiments, the polypropylene oxide-based polyetheramines comprise the Jeffamine series products available from Huntsman Chemical of Houston, Tex. Jeffamine series products are polyetheramines characterized by repeating oxypropylene units in their respective structures.

In addition to the first component (a) and second component (b) described above, the 2K adhesive compositions of the present invention also comprise (c) graphenic carbon particles.

As used herein, the term "graphenic carbon particles" means carbon particles having structures comprising one or more layers of one-atom-thick planar sheets of sp2-bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The graphenic carbon particles may be substantially flat; however, at least a portion of the planar sheets may be substantially curved, curled, creased, or buckled. The particles typically do not have a spheroidal or equiaxed morphology.

In certain embodiments, the graphenic carbon particles present in the compositions of the present invention have a thickness, measured in a direction perpendicular to the carbon atom layers, of no more than 10 nanometers, no more than 5 nanometers, or, in certain embodiments, no more than 4 or 3 or 2 or 1 nanometers, such as no more than 3.6 nanometers. In certain embodiments, the graphenic carbon particles may be from 1 atom layer up to 3, 6, 9, 12, 20 or 30 atom layers thick, or more. In certain embodiments, the graphenic carbon particles present in the compositions of the present invention have a width and length, measured in a direction parallel to the carbon atoms layers, of at least 50 nanometers, such as more than 100 nanometers, in some cases such as more than 100 nanometers up to 500 nanometers, or more than 100 nanometers up to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 10:1.

In certain embodiments, the graphenic carbon particles used in the compositions of the present invention have relatively low oxygen content. For example, the graphenic carbon particles used in certain embodiments of the compositions of the present invention may have an oxygen content of no more than 2 atomic weight percent, such as no more than 1 atomic weight percent, or no more than 0.6 atomic weight, such as about 0.5 atomic weight percent. The oxygen content of the graphenic carbon particles can be determined using X-ray Photoelectron Spectroscopy, such as is described in D. R. Dreyer et al., Chem. Soc. Rev. 39, 228-240 (2010).

In certain embodiments, the graphenic carbon particles used in the compositions of the present invention have a relatively low bulk density. For example, the graphenic carbon particles used in certain embodiments of the present invention are characterized by having a bulk density (tap density) of less than 0.2 g/cm$^3$, such as no more than 0.1 g/cm$^3$. For the purposes of the present invention, the bulk density of the graphenic carbon particles is determined by placing 0.4 grams of the graphenic carbon particles in a glass measuring cylinder having a readable scale. The cylinder is raised approximately one-inch and tapped 100 times, by striking the base of the cylinder onto a hard surface, to allow the graphenic carbon particles to settle within the cylinder. The volume of the particles is then measured, and the bulk density was calculated by dividing 0.4 grams by the measured volume, wherein the bulk density is expressed in terms of g/cm$^3$.

In certain embodiments, the graphenic carbon particles used in the compositions of the present invention have a B.E.T. specific surface area of at least 50 square meters per gram, such as from 50 to 1000 square meters per gram or from 50 to 600 square meters per gram, or, in some cases, 200 to 1000 square meters per grams or 200 to 400 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "*The Journal of the American Chemical Society*", 60, 309 (1938).

In certain embodiments, the graphenic carbon particles used in the compositions of the present invention have a Raman spectroscopy 2D/G peak ratio of at least 1.1. As used herein, the term "2D/G peak ratio" refers to the ratio of the intensity of the 2D peak at 2692 cm$^{-1}$ to the intensity of the G peak at 1,580 cm$^{-1}$.

In certain embodiments, the graphenic carbon particles used in the compositions of the present invention have a compressed density and a percent densification that is less than the compressed density and percent densification of graphite powder and certain types of substantially flat graphenic carbon particles. Lower compressed density and lower compression densification are each believed to contribute to better dispersion and rheological properties in adhesive compositions than correspondingly higher compressed density and higher compression densification. In certain of these embodiments, the compressed density of the graphenic carbon particles of the present invention is 0.9 or less, such as less than about 0.8, such as less than about 0.7, such as from 0.6 to 0.7. In certain embodiments, the percent compression densification of the graphenic carbon particles of the present invention is less than 40%, such as less than 30%, such as from 25 to 30%.

For purposes of the present invention, the compressed density of graphenic carbon particles is calculated from a measured thickness of a given mass of the particles after compression. Specifically, for purposes of the present invention, the measured thickness is determined by subjecting 0.1 gram of the graphenic carbon particles to cold press under 15,000 pounds of force in a 1.3 centimeter die for 45 minutes (contact pressure=500 MPa [Mega-Pascal] pressure). The compressed density of the graphenic carbon particles is then calculated from this measured thickness according to the following formula:

Compressed Density (g/cm$^3$)=(0.1 grams graphenic carbon particles)/($n$*(1.3 cm/2)$^2$*(measured thickness in cm)

The percent densification of the graphenic carbon particles is determined as the ratio of the determined or observed compressed density of the graphenic carbon particles (as determined in the previous paragraph) to the density of graphite (graphite density=2.2).

In certain other embodiments, the graphenic carbon particles of the present invention has a measured bulk liquid conductivity of at least 100 microSiemens, such as at least 120 microSiemens, such as at least 140 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a 0.5% solution of graphenic carbon particles in butyl cellosolve (the sample) is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

The graphenic carbon particles utilized in the compositions of the present invention can be made, for example, by thermal processes, such as by using the apparatus and method described in U.S. patent application Ser. No. 13/249,315 at [0022] to [0048], the cited portion of which being incorporated herein by reference, in which (i) one or more hydrocarbon precursor materials capable of forming a two-carbon species (such as n-propanol, ethane, ethylene, acetylene, vinyl chloride, 1,2-dichloroethane, allyl alcohol, propionaldehyde, and/or vinyl bromide) is introduced into a thermal zone (such as a plasma); and (ii) the hydrocarbon is heated in the thermal zone to a temperature of at least 1,000° C. to form the graphenic carbon particles. In addition, the graphenic carbon particles can be made by using the apparatus and method described in U.S. patent application Ser. No. 13/309,894 at [0015] to [0042], the cited portion of which being incorporated herein by reference, in which (i) a methane precursor material (such as a material comprising at least 50 percent methane, or, in some cases, gaseous or liquid methane of at least 95 or 99 percent purity or higher) is introduced into a thermal zone (such as a plasma); and (ii) the methane precursor is heated in the thermal zone to form the graphenic carbon particles. Such methods can produce graphenic carbon particles having at least some, in some cases all, of the characteristics described above.

Without being bound by any theory, it is currently believed that the foregoing methods of manufacturing graphenic carbon particles are particularly suitable for producing graphenic carbon particles having relatively low thickness and relatively high aspect ratio in combination with relatively low oxygen content, as described above. Moreover, such methods are currently believed to produce a substantial amount of graphenic carbon particles having a substantially curved, curled or buckled morphology (referred to herein as a "3D morphology" or as a "substantially 3D morphology), as opposed to producing predominantly particles having a substantially two-dimensional (or flat) morphology. This characteristic is believed to be reflected in the previously described compressed density characteristics and is believed to be beneficial in the adhesive composition applications of the present invention because, it is currently believed, when a significant portion of the graphenic carbon particles have a substantially 3-dimensional morphology, "edge to edge and" edge to face contact between graphenic carbon particles within the composition may be promoted. This is thought to be because particles having a substantially 3-dimensional morphology are less likely to be aggregated in the adhesive composition (due to lower Van der Waals forces) than particles having a two-dimensional morphology. Moreover, it is currently believed that even in the case of "face to face contact between the particles having a 3D morphology, since the particles may have more than one facial plane, the entire particle surface is not engaged in a single "face to face interaction with another single particle, but instead can participate in interactions with one or the other particles, including other "face to face interactions, in other planes. As a result, graphenic carbon particles having a 3D morphology are currently thought to provide the best conductive pathway in the present compositions and are currently thought to be useful for obtaining electrical conductivity characteristics sought by the present invention, particularly when the graphenic carbon particles are present in the composition in the relatively low amounts described below. Also, graphenic carbon particles having a 3 D morphology are currently thought to provide for increased surface area for the particles, and hence increased oil absorption characteristics and dispersibility of the graphenic carbon particles as compared with graphenic carbon particles having a substantially flat morphology, and hence improved rheology characteristics through the use of the graphenic carbon particles having the substantially 3-dimensional morphology, sought by the adhesive compositions of present invention, particularly when these graphenic carbon particles are present in the composition in the relatively low amounts described below. Improved theological features of these adhesive compositions, as illustrated in the Examples below, may be realized in terms of increased shear thinning ratio (at 25° C. and/or at 45° C.), improved viscosity recovery, and/or improved Thixotropic index (the methods for determining each of these values is described in the Examples supplied herein) as compared with adhesive compositions including graphenic carbon particles having a substantially flat morphology (even at lower loading levels), or graphite particles, or in the absence of graphenic carbon particles.

In addition, it is believed that the introduction of graphenic carbon particles (c) of the present invention into a 2K adhesive composition in an effective amount may also provide improved mechanical properties, such as increased tensile modulus, while maintaining a glass transition temperature as compared with 2K adhesive composition of the same composition not including graphenic carbon particles.

In certain embodiments, graphenic carbon particles (c) of the present invention are roll-milled in an epoxy carrier resin, such as Epon® 828, for introduction to the 2K adhesive composition. In one exemplary embodiment, a master-batch of graphenic carbon particles/added epoxy resin is formed by milling the graphenic carbon particles of the present invention into the epoxy resin at 10 weight percent or higher concentration. A dispersing method includes typical pigment grind mills such as three-roll mill, Eiger mill, Netsch/Premier mill and the like.

In certain embodiments, the amount (i.e. the effective amount) of graphenic carbon particles (c) included in certain 2K adhesive compositions of the present invention utilized to achieve such improved theological properties and mechanical properties (such as increased tensile modulus) is from about 1 to 10 weight percent, such as from 3 to 7 weight percent, based on the total weight of the 2K adhesive composition.

In still another embodiment, reinforcement fillers may be added to the adhesive composition as a part of the first component or as a part of the second component, or both.

Useful reinforcement fillers that may be introduced to the adhesive composition to provide improved mechanical properties include fibrous materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. More preferably, fiber glass ground to 5 microns or wider and to 100-300 microns in length is utilized. Preferably, such reinforcement fillers, if utilized, comprise from 0.5 to 25 weight percent of the adhesive composition.

In still another embodiment, fillers, thixotropes, colorants, tints and other materials may be added to the first or second component of the adhesive composition.

Useful thixotropes that may be used include untreated fumed silica and treated fumed silica, Castor wax, clay, and organoclay. In addition, fibers such as synthetic fibers like Aramid® fiber and Kevlar® fiber, acrylic fibers, and engineered cellulose fiber may also be utilized.

Useful colorants or tints may include red iron pigment, titanium dioxide, calcium carbonate, and phthalocyanine blue.

Useful fillers that may be used in conjunction with thixotropes may include inorganic fillers such as inorganic clay or silica.

In still another embodiment, if needed, a catalyst may be introduced to the adhesive composition, preferably as a part of the second component, to promote the reaction of the epoxide groups of first component and amine groups of the second component.

Useful catalysts that may be introduced to the adhesive composition include Ancamide® products available from Air Products and products marketed as "Accelerators" available from the Huntsman Corporation. One exemplary catalyst is piperazine-base Accelerator 399 (AHEW: 145) available from the Huntsman Corporation. When utilized, such catalysts comprise between 0 and about 10 percent by weight of the total adhesive composition.

In addition, a catalytic effect may be expected from the reaction product of epichlorohydrin from the first component and the amine compound from the second component in an equivalent ratio of 1:1. An example of such a product is Tetrad® and Tetrad®C available from Mitsubishi Gas Chemical Corporation.

In certain embodiments, rubber particles having a core/shell structure may be included in the 2K adhesive formulation.

Suitable core-shell rubber particles are comprised of butadiene rubber; however, other synthetic rubbers could be employed; such as styrene-butadiene and acrylonitrile-butadiene and the like. The type of synthetic rubber and the rubber concentration should not be limited as long as the particle size falls under the specified range as illustrated below.

In certain embodiments, the average particle size of the rubber particles may be from about 0.02 to 500 microns (20 nm to 500,000 nm).

In certain embodiments, the core/shell rubber particles are included in an epoxy carrier resin for introduction to the 2K adhesive composition. Suitable finely dispersed core-shell rubber particles in an average particle size ranging from 50 nm to 250 nm are master-batched in epoxy resin such as aromatic epoxides, phenolic novolac epoxy resin, Bisphenol A and Bisphenol F diepoxide and aliphatic epoxides, which include cyclo-aliphatic epoxides at concentration ranging from 20 to 40 weight percent. Suitable epoxy resins may also include a mixture of epoxy resins.

Exemplary non-limiting commercial core/shell rubber particle products using poly(butadiene) rubber particles having an average particle size of 100 nm that may be utilized in the 2K adhesive composition includes Kane Ace MX 136 (a core-shell poly(butadiene) rubber dispersion (25%) in Bisphenol F), Kane Ace MX 153 (a core-shell poly(butadiene) rubber dispersion (33%) in Epon® 828), Kane Ace MX 257 (a core-shell poly(butadiene) rubber dispersion (37%) in Bisphenol A), and Kane Ace MX 267 (a core-shell poly(butadiene) rubber dispersion (37%) in Bisphenol F), each available from Kaneka Texas Corporation.

Exemplary non-limiting commercial core/shell rubber particle products using styrene-butadiene rubber particles having an average particle size of 100 nm that may be utilized in the 2K adhesive composition includes Kane Ace MX 113 (a core-shell styrene-butadiene rubber dispersion (33%) in low viscosity Bisphenol A), Kane Ace MX 125 (a core-shell styrene-butadiene rubber dispersion (25%) in Bisphenol A), Kane Ace MX 215 (a core-shell styrene-butadiene rubber dispersion (25%) in DEN-438 phenolic novolac epoxy), and Kane Ace MX 416 (a core-shell styrene-butadiene rubber dispersion (25%) in MY-721 multi-functional epoxy), Kane Ace MX 451 (a core-shell styrene-butadiene rubber dispersion (25%) in MY-0510 multi-functional epoxy), Kane Ace MX 551 (a core-shell styrene-butadiene rubber dispersion (25%) in Synasia 21 Cyclo-aliphatic Epoxy), Kane Ace MX 715 (a core-shell styrene-butadiene rubber dispersion (25%) in polypropylene glycol (MW 400)), each available from Kaneka Texas Corporation.

In certain embodiments, the amount of core/shell rubber particles included in the 2K adhesive formulation is from 0.1 to 10 weight percent, such as from 0.5 to 5 weight percent, based on the total weight of the 2K adhesive composition.

1K Adhesives

As noted above, the present invention is also directed at 1K adhesive compositions. A 1K, or one-component, adhesive composition is an adhesive composition that requires activation from an external energy source in order to cure (i.e. crosslink). In the absence of activation from the external energy source, the composition will remain largely unreacted for long periods of time. In certain embodiments, all of the components of a 1K adhesive composition may be stored together in a single storage container. External energy sources that may be used to promote the curing reaction include radiation (i.e. actinic radiation such as ultraviolet light), heat, and/or moisture.

In certain embodiments, the 1K adhesive compositions of present invention comprise (a) a first component; (b) a second component that chemically reacts with the first component upon activation from an external energy source; and (c) graphenic carbon particles, wherein the graphenic carbon particles are the same graphenic carbon particles having a substantially 3-dimensional morphology as described above with respect to the 2K adhesive compositions. For thermally curing 1K adhesive compositions, the second component (b) comprises (d) a heat-activated latent curing agent.

Similar to the 2K adhesives, in certain embodiments, the introduction of an effective amount of (c) graphenic carbon particles having a substantially 3-dimensional morphology into a 1K adhesive composition of the present invention may provide improved mechanical properties, such as increased tensile modulus, while maintaining a glass transition temperature as compared with 1K adhesives of the same composition not including the graphenic carbon particles.

In addition, in certain embodiments, and as confirmed by the Examples supplied herein, the inclusion of an effective amount of graphenic carbon particles having a substantially 3-dimensional morphology into certain 1K adhesive compositions of the present invention may provide improved rheological features of the resultant 1K adhesive compositions as compared with 1K adhesives of the same composition not including the graphenic carbon particles and as compared with 1K adhesive compositions utilizing graphenic carbon particles having a substantially flat morphology. These improved rheological features may include one or more of: higher shear thinning rates (at 25° C. and/or at 45° C.), higher viscosity recovery, and higher Thixotropic Index for the resultant 1K adhesive compositions.

In certain embodiments, the amount (i.e. the effective amount) of graphenic carbon particles included in certain 1K adhesive compositions of the present invention utilized to achieve such improved rheological properties and mechanical properties (such as increased tensile modulus) is from about 1 to 10 weight percent, such as from 3 to 7 weight percent, based on the total weight of the 1K adhesive composition.

In certain other embodiments, the external energy source is a thermal source such as an oven that heats the composition to a temperature above ambient or slightly thermal temperatures.

The first component (a), in certain embodiments, comprises one or more epoxy compound and/or epoxy-adducts. Suitable epoxy compounds and/or epoxy adducts include those epoxy compounds and epoxy adducts described above with respect to 2K adhesive systems and not repeated herein.

In certain embodiments, the heat-activated latent curing agent (d) that may be used include guanidines, substituted guanidines, substituted ureas, melamine resins, guanamine derivatives, cyclic tertiary amines, aromatic amines and/or mixtures thereof. The hardeners may be involved stoichiometrically in the hardening reaction; they may, however, also be catalytically active. Examples of substituted guanidines are methylguanidine, dimethylguanidine, trimethylguanidine, tetra-methylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. In addition, catalytically-active substituted ureas may also be used. Suitable catalytically-active substituted ureas include p-chlorophenyl-N,N-dimethylurea, 3-phenyl-1,1-dimethylurea (fenuron) or 3,4-dichlorophenyl-N,N-dimethylurea.

In certain other embodiments, the heat-activated latent curing agent also or alternatively comprises dicyandiamide and 3,4-dichlorophenyl-N,N-dimethylurea (also known as Diuron).

In certain embodiments, the 1K adhesive may include from 3 to 25 weight percent, such as from 5 to 10 weight percent, of (b) the heat-activated latent curing agent, based on the total weight of the 1K adhesive composition of the 1K adhesive composition including parts (a)-(f).

In certain embodiments, the 1K adhesives of the present invention comprise: (a) an epoxy-capped flexibilizer; and (b) a heat-activated latent curing agent. In certain other embodiments, the 1K adhesives may further comprise one or more of the following components: (c) an epoxy/CTBN (carboxyl-terminated butadiene acrylonitrile polymer) adduct; (d) an epoxy/dimer acid adduct; (e) rubber particles having a core/shell structure; and (f) graphenic carbon particles. The graphenic carbon particles (f) are the same graphenic carbon particles having a substantially 3-dimensional morphology that are described above with respect to the 2K adhesive systems and the generic 1K adhesive systems described above, while the components (a)-(e) are described further below.

In certain embodiments, the (a) epoxy-capped flexibilizer is formed as the reaction product of reactants comprising a first epoxy compound, a polyol, and an anhydride and/or a diacid (i.e. an anhydride, a diacid, or both an anhydride and a diacid may be part of the reaction product)

Useful epoxy compounds that can be used include polyepoxides. Suitable polyepoxides include polyglycidyl ethers of Bisphenol A, such as Epon® 828 and 1001 epoxy resins, and Bisphenol F diepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting first epoxy compounds include epoxidized Bisphenol A novolacs, epoxidized phenolic novolacs, epoxidized cresylic novolac, and triglycidyl p-aminophenol bismaleimide.

Useful polyols that may be used include diols, triols, tetraols and higher functional polyols. The polyols can be based on a polyether chain derived from ethylene glycol, propylene glycol, butylenes glycol, hexylene glycol and the like and mixtures thereof. The polyol can also be based on a polyester chain derived from ring opening polymerization of caprolactone. Suitable polyols may also include polyether polyol, polyurethane polyol, polyurea polyol, acrylic polyol, polyester polyol, polybutadiene polyol, hydrogenated polybutadiene polyol, polycarbonate polyols, polysiloxane polyol, and combinations thereof. Polyamines corresponding to polyols can also be used, and in this case, amides instead of carboxylic esters will be formed with acids and anhydrides.

Suitable diols that may be utilized are diols having a hydroxyl equivalent weight of between 30 and 1000. Exemplary diols having a hydroxyl equivalent weight from 30 to 1000 include diols sold under the trade name Terathane®, including Terathane® 250, available from Invista. Other exemplary diols having a hydroxyl equivalent weight from 30 to 1000 include ethylene glycol and its polyether diols, propylene glycol and its polyether diols, butylenes glycol and its polyether diols, hexylene glycols and its polyether diols, polyester diols synthesized by ring opening polymerization of caprolactone, and urethane diols synthesized by reaction of cyclic carbonates with diamines. Combination of these diols and polyether diols derived from combination various diols described above could also be used. Dimer diols may also be used including those sold under trade names Pripol® and Solvermol™ available from Cognis Corporation.

Polytetrahydrofuran-based polyols sold under the trade name Terathane®, including Terathane® 650, available from Invista, may be used. In addition, polyols based on dimer diols sold under the trade names Pripol® and Empol®, available from Cognis Corporation, or bio-based polyols, such as the tetrafunctional polyol Agrol 4.0, available from BioBased Technologies, may also be utilized.

Useful anhydride compounds to functionalize the polyol with acid groups include hexahydrophthalic anhydride and its derivatives (e.g. methyl hexahydrophthalic anhydride); phthalic anhydride and its derivatives (e.g. methyl phthalic anhydride); maleic anhydride; succinic anhydride; trimellitic anhydride; pyromellitic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexamfluoroisopropylidene)anhydride (61'1)A). Useful diacid compounds to functionalize the polyol with acid groups include phthalic acid and its derivatives (e.g. methyl phthalic acid), hexahydrophthalic acid and its derivatives (e.g. methyl hexahydrophthalic acid), maleic acid, succinic acid, adipic acid, etc. Any diacid and anhydride can be used; however, anhydrides are preferred.

In one embodiment, the polyol comprises a diol, the anhydride and/or diacid comprises a monoanhydride or a diacid, and the first epoxy compound comprises a diepoxy compound, wherein the mole ratio of diol, monoanhydride (or diacid), and diepoxy compounds in the epoxy-capped flexibilizer may vary from 0.5:0.8:1.0 to 0.5:1.0:6.0.

In another embodiment, the polyol comprises a diol, the anhydride and/or diacid comprises a monoanhydride or a diacid, and the first epoxy compound comprises a diepoxy compound, wherein the mole ratio of diol, monoanhydride (or a diacid), and diepoxy compounds in the epoxy-capped flexibilizer may vary from 0.5:0.8:0.6 to 0.5:1.0:6.0.

In certain embodiments, the (a) epoxy-capped flexibilizer comprises the reaction product of reactants comprising an epoxy compound, an anhydride and/or a diacid, and a caprolactone. In certain other embodiments, a diamine and/or a higher functional amine may also be included in the reaction product in addition to the epoxy compound, caprolactone, and the anhydride and/or a diacid.

Suitable epoxy compounds that may be used to form the epoxy-capped flexibilizer include epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., Bisphenol A; bis(4-hydroxyphenyl)-1,1-isobutane; 4,4-dihydroxybenzophenone; bis(4-hydroxyphenol)-1,1-ethane; bis (2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

Useful anhydride compounds that may be utilized include hexahydrophthalic anhydride and its derivatives (e.g. methyl hexahydrophthalic anhydride); phthalic anhydride and its derivatives (e.g. methyl phthalic anhydride); maleic anhydride; succinic anhydride; trimellitic anhydride; pyromellitic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexamfluoroisopropylidene) anhydride (6FDA). Useful diacid compounds to functionalize the polyol with acid groups include phthalic acid and its derivates (e.g. methyl phthalic acid), hexahydrophthalic acid and its derivatives (e.g. methyl hexahydrophthalic acid), maleic acid, succinic acid, adipic acid, etc. Any diacid and anhydride can be used; however, anhydrides are preferred.

Useful caprolactones that can be used include caprolactone monomer, methyl, ethyl, and propyl substituted caprolactone monomer, and polyester diols derived from caprolactone monomer. Exemplary polyester diols having a molecular weight from about 400 to 8000 include diols sold under the trade name CAPA®, including CAPA® 2085, available from Perstorp.

In one embodiment, the caprolactone comprises a carprolactone monomer, the anhydride and/or diacid comprises a monoanhydride or a diacid, and the first epoxy compound comprises a diepoxy compound, wherein the mole ratio of caprolactone monomer, monoanhydride (or diacid), and diepoxy compounds in the epoxy-capped flexibilizer may vary Crum 0.5:0.8:1.0 to 0.5:1.0:6.0.

In one embodiment, the caprolactone comprises a carprolactone monomer, the anhydride and/or diacid comprises a monoanhydride or a diacid, and the first epoxy compound comprises a diepoxy compound, wherein the mole ratio of caprolactone monomer, monoanhydride (or diacid), and diepoxy compounds in the epoxy-capped flexibilizer may vary from 0.5:0.8:0.6 to 0.5:1.0:6.0.

In one embodiment, the caprolactone comprises a carprolactone monomer, the anhydride and/or diacid comprises a monoanhydride or a diacid, the diamine or higher functional amine comprises a diamine, and the first epoxy compound comprises a diepoxy compound, wherein the mole ratio of caprolactone monomer, monoanhydride (or diacid), diamine and diepoxy compounds in the epoxy-capped flexibilizer may vary from 2:1:2:2 to 3:1:3:3.

In certain embodiments, the (a) epoxy-capped flexibilizer comprises the reaction product of reactants comprising an epoxy compound and a primary or secondary polyether amine.

Suitable epoxy compounds that may be used to form the epoxy-capped flexibilizer include epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., Bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

Useful primary and secondary polyether amine compounds that can be used to form the epoxy-capped flexibilizer include amine-terminated polyethyleneglycol such as Huntsman Corporation Jeffamine ED series and amine-terminated polypropylene glycol such as Huntsman Corporation Jeffamine D series; and amine-terminated polytetrahydrofuran such as Huntsman Jeffamine EDR series. Primary amines having a functionality higher than 2 include, for example, the Jeffamine T series, available from Huntsman Corporation, which are amine-terminated propoxylated trimethylolpropane or glycerol and aminated propoxylated pentaerythritols.

In one embodiment, the epoxy compound comprises a diepoxide, and the primary or secondary polyether amine comprises a difunctional amine, wherein the mole ratio of diepoxide to difunctional amine varies from 2:0.2 to 2:1.

In certain embodiments, the 1K adhesive may include from 2 to 40 weight percent, such as from 10 to 20 weight percent, of (a) the epoxy-capped flexibilizer, based on the total weight of the 1K adhesive composition of the 1K adhesive composition including parts (a)-(f), of any of the forms described above.

In still other related embodiments, the (a) the epoxy-capped flexibilizer may comprise a mixture of any two or more of the epoxy-capped flexibilizers described above, wherein the total weight percent of the mixture of the two or more of the epoxy-capped flexibilizers comprises from 2 to 40 weight percent, such as from 10 to 20 weight percent, based on the total weight of the 1K adhesive composition of the 1K adhesive composition including parts (a)-(f).

In certain embodiments, the heat-activated latent curing agent (b) that may be used include guanidines, substituted guanidines, substituted ureas, melamine resins, guanamine derivatives, cyclic tertiary amines, aromatic amines and/or mixtures thereof. The hardeners may be involved stoichiometrically in the hardening reaction; they may, however, also be catalytically active. Examples of substituted guanidines are methylguanidine, dimethylguanidine, trimethylguanidine, tetra-methylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. In addition, catalytically-active substituted ureas may also be used. Suitable catalytically-active substituted ureas include p-chlorophenyl-N,N-dimethylurea, 3-phenyl-1,1-dimethylurea (fenuron) or 3,4-dichlorophenyl-N,N-dimethylurea.

In certain other embodiments, the heat-activated latent curing agent (b) also or alternatively comprises dicyandiamide and 3,4-dichlorophenyl-N,N-dimethylurea (also known as Diuron).

In certain embodiments, the 1K adhesive may include from 3 to 25 weight percent, such as from 5 to 10 weight percent, of (b) the heat-activated latent curing agent, based on the total weight of the 1K adhesive composition of the 1K adhesive composition including parts (a)-(f).

As noted above, in certain embodiments, the 1K adhesive composition may include (c) an epoxy/CTBN adduct. In certain embodiments, CTBN liquid polymers undergo addition esterification reactions with epoxy resins, allowing them to serve as elastomeric modifiers to enhance impact strength, peel strength, and crack resistance.

Suitable epoxy compounds that may be used to form the epoxy/CTBN adduct include epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., Bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

In certain embodiments, at least a portion, often at least 5 percent by weight, of the polyepoxide has been reacted with a carboxyl-terminated butadiene acrylonitrile polymer. In certain of these embodiments, the carboxyl-terminated butadiene acrylonitrile polymers have an acrylonitrile content of 10 to 26 percent by weight. Suitable CTBN compounds having an acrylonitrile content of 10 to 26 percent by weight that may be used include Hypro 1300X8, Hypro 1300X9, Hypro 1300X13, Hypro 1300X18, and Hypro 1300X31, each available from Emerald Specialty Polymers, LLC of Akron, Ohio.

In certain other embodiments, the polyepoxide may be reacted with a mixture of different carboxy-terminated butadiene acrylonitrile polymers.

In certain embodiments, the functionality of the CTBN utilized is from 1.6 to 2.4, and the epoxy compound is reacted with the CTBN material in a stoichiometric amount to form the epoxy/CTBN adduct.

In certain embodiments, the epoxy/CTBN adduct comprises from about 1 to 20 weight percent, such as from 5 to 10 weight percent, of the total weight of the 1K adhesive composition of the 1K adhesive composition including parts (a)-(f).

As noted above, in certain embodiments, the 1K adhesive composition may include (d) an epoxy/dimer acid adduct. In certain embodiments, the epoxy/dimer acid adduct may be formed by reacting an epoxy compound with a dimer acid.

Suitable epoxy compounds that may be used to form the epoxy/dimer acid adduct include epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., Bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc. and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

As defined herein, dimer acids, or dimerized fatty acids, are dicarboxylic acids prepared by dimerizing unsaturated fatty acids obtained from tall oil, usually on clay catalysts. Dimer acids usually predominantly contain a dimer of stearic acid known as C36 dimer acid. A suitable dimer acid for use in forming the epoxy/dimer acid adduct of the present invention may be obtained from Croda, Inc. or from Cognis.

In certain embodiments, the epoxy compounds and dimer acids are reacted in stoichiometric amounts to form the epoxy/dimer acid adduct.

In certain embodiments, the epoxy/dimer acid adduct comprises from about 1 to 15 weight percent, such as from 2 to 7 weight percent, of the total weight of the 1K adhesive composition of the 1K adhesive composition including parts (a)-(f).

As noted above, in certain embodiments, the 1K adhesive composition may also include (e) rubber particles having a core/shell structure. Suitable core shell rubber particles for use in the 1K adhesives are the same as those described above with respect to the 2K adhesive formulations and therefore not repeated herein.

In certain embodiments, the 1K adhesive may include from 0 to 75 weight percent, such as from 5 to 60 weight percent, of (e) the rubber particles having a core/shell structure, based on the total weight of the 1K adhesive composition including parts (a)-(f).

As noted above, in certain embodiments, the 1K adhesive composition may also include (f) graphenic carbon particles. Suitable graphenic carbon particles for use in the 1K adhesives compositions are graphenic carbon particles having a substantially 3-dimensional morphology as described above therefore not repeated herein. In certain embodiments, the 1K adhesive may include from 1 to 10 weight percent, such as from 3 to 7 weight percent, of (f) the graphenic carbon particles, based on the total weight of the 1K adhesive composition including parts (a)-(f).

In still other embodiments, the 1K adhesive formulation may also include epoxy compounds or resins that are not incorporated into or reacted as a part of any of the components (a)-(f) above, including epoxy-functional polymers that can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials includes polyepoxides comprising epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., Bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Frequently used polyepoxides include polyglycidyl ethers of Bisphenol A, such as Epon® 828 epoxy resin which is commercially available from Hexion Specialty Chemicals, Inc. and having a number average molecular weight of about 400 and an epoxy equivalent weight of about 185-192. Other useful polyepoxides include polyglycidyl ethers of other polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

In still another embodiment, reinforcement fillers may be added to the adhesive composition. Useful reinforcement fillers that may be introduced to the adhesive composition to provide improved mechanical properties include fibrous materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. More preferably, fiber glass ground to 5 microns or wider and to 100-300 microns in length is utilized. Preferably, such reinforcement fillers, if utilized, comprise from 0.5 to 25 weight percent of the 1K adhesive composition.

In still another embodiment, fillers, thixotropes, colorants, tints and other materials may be added to the 1K adhesive composition.

Useful thixotropes that may be used include untreated fumed silica and treated fumed silica, Castor wax, clay, and organoclay. In addition, fibers such as synthetic fibers like Aramid® fiber and Kevlar® fiber, acrylic fibers, and engineered cellulose fiber may also be utilized.

Useful colorants or tints may include red iron pigment, titanium dioxide, calcium carbonate, and phthalocyanine blue.

Useful fillers that may be used in conjunction with thixotropes may include inorganic fillers such as inorganic clay or silica.

Exemplary other materials that may be utilized include, for example, calcium oxide and carbon black.

While the use of graphenic carbon particles having a three-dimensional morphology in the present invention is directed towards adhesive compositions, it is specifically contemplated that these graphenic carbon particles may also be suitable for use in other coating compositions, including any other coating composition that utilizes graphite particles to improve some rheological or mechanical feature of the coating. For example, graphenic carbon particles having a three-dimensional morphology may be added in an effective amount to other types of coating compositions to provide improved mechanical properties, such as increased tensile modulus, while maintaining a glass transition temperature, or to improve certain rheological features as described above. Exemplary coating compositions wherein it may thus be utilized include, but are not limited to, primer compositions (particularly primer compositions having anti-chip properties, including waterborne primers), basecoat compositions, sealants, or any coating composition comprising a film forming polymer.

Illustrating the invention are the following examples that are not to be considered as limiting the invention to their details. All parts and percentages in the examples, as well as throughout the specification, are by weight unless otherwise indicated.

EXAMPLES

Example A

Preparation of Graphenic Carbon Particles

Figure 2:
FIG. 2 is a TEM micrograph of a sample of the material produced according to Example A.

Graphenic carbon particles were produced using a DC thermal plasma reactor system. The main reactor system included a DC plasma torch (Model SG-100 Plasma Spray Gun commercially available from Praxair Technology, Inc., Danbury, Conn.) operated with 60 standard liters per minute of argon carrier gas and 26 kilowatts of power delivered to the torch. Methane precursor gas, commercially available from Airgas Great Lakes, Independent, Ohio, was fed to the reactor at a rate of 5 standard liters per minute about 0.5 inch downstream of the plasma torch outlet. Following a 14 inch long reactor section, a plurality of quench stream injection ports were provided that included 6⅛ inch diameter nozzles located 60° apart radially. Quench argon gas was injected through the quench stream injection ports at a rate of 185 standard liters per minute. The produced particles were collected in a bag filter. The total solid material collected was 75 weight percent of the feed material, corresponding to a 100 percent carbon conversion efficiency. Analysis of particle morphology using Raman analysis and high resolution transmission electron microscopy (TEM) indicates the formation of a graphenic layer structure with average thickness of less than 3.6 nm. The Raman plot shown in FIG. 1 demonstrates that graphenic carbon particles were formed by virtue of the sharp and tall peak at 2692 on the plot versus shorter peaks at 1.348 and 1580. The TEM image of FIG. 2 shows the thin plate-like graphenic carbon particles. The measured B.E.T. specific surface area of the produced material was 270 square meters per gram using a Gemini model 2360 analyzer available from Micromeritics Instrument Corp., Norcross, Ga. Composition analysis of the produced material showed 99.5 atomic weight % carbon and 0.5 atomic weight % oxygen using X-ray Photoelectron Spectroscopy (XPS) available from Thermo Electron Corporation. The collected particles had a bulk density of about 0.05 g/cm$^3$, a compressed density of 0.638 g/cm$^3$ and a percent densification of 29%. The measured bulk liquid conductivity from 0-40 minutes of a 0.5% solution of the collected graphenic carbon particles in butyl cellosolve varied from 143 to 147 microSiemens.

Example B

Evaluation of 2K Adhesives

In Example B, graphenic carbon particles were evaluated for rheological performance in the first component of a 2K adhesive (Example 2) versus a 2K adhesive containing no graphenic carbon particles (Example 1), commercially available graphenic carbon particles (Example 3) or graphite (Example 4). The formulas evaluated are shown in Table 1:

TABLE 1

| Part A (epoxy) | Ex. 1 | Ex. 2 | Ex. 3 | Ex. 4 |
|---|---|---|---|---|
| Epon 828[1] | 41.05 | 41.05 | 41.05 | 41.05 |
| Graphenic Carbon Particles[2] | | 2.64 | | |
| xGnP C750 Graphenic carbon black[3] | | | 4.56 | |
| Graphite[4] | | | | 5.7 |
| Epon 828/Terathane 650/HHPA[6] | 12.1 | 12.1 | 12.1 | 12.1 |

TABLE 1-continued

| Part A (epoxy) | Ex. 1 | Ex. 2 | Ex. 3 | Ex. 4 |
|---|---|---|---|---|
| Wacker HDK H17[6] | 1 | 1 | 1 | 1 |
| % Graphenic Carbon Particles or Graphite in total formula | 0.00% | 4.60% | 7.80% | 9.50% |

[1]Bisphenol A-Epichlorohydrin resin available from Huntsman Advance Materials.
[2]Graphenic carbon particles produced in Example A above.
[3]Commercially available from XG Science, Inc. The product data information of the C750 graphenic carbon particles discloses a typical particle thickness of 5-15 nanometers, a surface area of 750 square meters per gram, an oxygen content of less than 2 atomic weight percent, and a bulk density of 0.03-0.15 g/cm$^3$. The measured bulk liquid conductivity from 0-40 minutes of a 0.5% solution of C750 graphenic particles in butyl cellosolve varied between 0.50 and 0.55 microSiemens. The measured compressed density and percent densification of the C750 graphenic carbon particles was 0.94-1.08 g/cm$^3$ and 42-49%, respectively.
[4]Graphite available from Sigma-Aldrich, which had a compressed density of 1.57 and a percent densification of 71.4%.
[5]Epon 828/Terathane 650/Hexahydrophthalic anhydride adduct; EEW 412
[6]Hydrophobic Fumed Silica available from Wacker Chemie AG In these examples, Epon 828 and the graphenic carbon particles or the xGnP C750 graphenic carbon black particles (where utilized) were pre-mixed and roll-milled three times. The remainder of the ingredients, except the fumed silica, were added to the mixture and mixed in the SpeedMix DAC 600 FVZ for 1 minute at 2350 RPM. The fumed silica was then added to the mixture and mixed again for 1 minute at 2350 RPM. Finally, the mixture was mixed using a low shear motor under vacuum.

Examples 1-4 were then evaluated for shear thinning ratio based on a flow curve and for viscosity recovery. From these tests, a Thixotropic Index can be determined for the adhesive sample.

Shear thinning ratio is a measurement to determine the degree to which an adhesive will shear thin. This test utilizes an Aton-Paar Physica MCR 301 Rheometer with 25 mm plate and 0.7 mm gap for evaluating the adhesive. In this test, viscosity of the sample is measured as a function of increasing shear rate (0.01 to 1000 s$^{-1}$) in rotation mode. The viscosity is measured at 25° C. and 45° C., respective. In this test, the adhesive sample is pre-sheared at 10 revolutions per second for 10 seconds prior to beginning of the test. As one of ordinary skill recognizes, a higher shear thinning ratio at 25° C. and 45° C. is better for sprayability of the adhesive to a substrate.

Viscosity recovery curve testing is utilized to determine how the viscosity of an adhesive sample recovers after high shear, and thereby assesses the thixotropic behavior of an adhesive sample. In this test, an Anton-Paar Physica MCR 301 Rheometer with 25 mm plate and 0.7 mm gap is utilized to measure the viscosity as a function of time with the following shear conditions:

T1: oscillation at 1 Hz with 5% strain for 5 minutes (low shear region);
T2: rotation at 5000 s$^{-1}$ for 5 min (high shear region); Stop for 2 seconds;
T3: oscillation at 1 Hz with 5% strain for 8 min (low shear region).

The rotational mode high shear region (T2) represents spraying action, following oscillation mode, while the low shear region (T3) represents the viscosity of the sample after it is spray applied onto the substrate (immediately after application (10.2 minutes) and at 17 minutes). The T3 value at 17 minutes (hereinafter referred to as "viscosity recovery") is indicative of the sag resistance of the adhesive, and thus a higher viscosity recovery suggests an increased sag resistance for the adhesive sample over a lower viscosity recovery. An increased sag resistance for the adhesive sample (i.e. a higher value for the viscosity recovery), as one of ordinary skill in the adhesive arts recognizes, is more desirable than a lower value.

The Thixotropic Index is another method to measure the rheological properties of an adhesive composition. The Thixotropic Index logarithmically compares the viscosity of the adhesive sample after 7 minutes of recovery (i.e. at 17 minutes) versus the viscosity of the sample as it is being applied (i.e. immediately prior to recovery, or at 10 minutes), or (Log 17 min/10 min). A higher calculated Thixotropic Ratio is indicative of improved non-sagging performance of the adhesive composition after application to a substrate.

The results of the rheological testing of Examples 1-4 are summarized in Tables 2 and 3 below and indicate that the adhesive sample including graphenic carbon particles (Example 2) exhibited a higher shear thinning ratio at 45° C., a higher viscosity recovery ((T3) at 17 minutes), and a higher calculated Thixotropic Index than the other representative samples (Examples 1, 3 and 4). Example 2 also confirms that such results were achievable at lower loading of graphenic carbon particles than the corresponding graphenic carbon particle loading (Example 3) or graphite loading (Example 4) of the corresponding 2K adhesives.

TABLE 2

Shear Thinning Ratio at 25° C. and 45° C.

| Part A (epoxy) | Ex. 1 | Ex. 2 | Ex. 3 | Ex. 4 |
|---|---|---|---|---|
| Shear Thinning ratio @ 25° C. | 1.53 | 1.31 | 1.51 | 1.71 |
| Shear Thinning ratio @ 45° C. | 2.6 | 5.17 | 2.92 | 2.23 |

TABLE 3

Viscosity Recovery and Thixotropic Index

| Viscosity Recovery | Viscosity, Pa · s | | | |
|---|---|---|---|---|
| 5 minutes @ low shear oscillation-T1 | 61.9 | 89.4 | 113 | 80.8 |
| 10 minutes @ high shear rotation-T2 | 1.73 | 2.63 | 2.2 | 2.48 |
| 10.2 minutes @ low shear oscillation-T3 | 7.91 | 62.3 | 17 | 13.6 |
| 17 minutes @ low shear oscillation-T3 | 40.4 | 167 | 96.8 | 58.3 |
| Thixotropic Index (Log 17 min/10 min) | 1.37 | 1.8 | 1.64 | 1.37 |

As is apparent from the foregoing, certain 2K adhesive compositions of the present invention comprise a mixture comprising (a) a first component comprising, for example, one or more epoxy compounds and/or epoxy-adducts and (c) graphenic carbon particles, wherein that mixture is stored separately from (b) a second component that chemically reacts with the first component. In certain of these compositions: (1) a shear thinning ratio at 45 degrees Celsius of the mixture comprising (a) and (c) is at least 20 percent greater than the shear thinning ratio at 45 degrees Celsius of a comparative mixture comprising component (a) but not including (c); (2) a viscosity recovery ((T3) at 17 minutes) of the mixture comprising (a) and (c) is at least 3 times greater than the viscosity recovery ((T3) at 17 minutes) of a comparative mixture comprising component (a) but not including (c); and/or (3) a Thixotropic Index of the mixture comprising (a) and (c) is at least 25 percent greater than the Thixotropic Index of a comparative mixture comprising component (a) but not including (c). As used in this context, the term "comparative mixture means a mixture that has the same ingredients in the same amounts as another mixture to which it is being compared, with the sole exception that, in the comparative mixture, (c) is not present.

Example C

Evaluation of 1K Adhesives

In Example C, graphenic carbon particles of the present invention were evaluated for rheological performance (Example 6) versus a 1K adhesive containing no graphenic carbon particles (Example 5) and versus commercially available graphenic carbon particles (Example 7) at similar loading levels. The formulas evaluated are shown in Table 4.

TABLE 4

| 1K Structural adhesive | Ex. 5 | Ex. 6 | Ex. 7 |
|---|---|---|---|
| Epon 828[1] | 51.7 | 51.7 | 29.7 |
| Graphenic Carbon Particles[2] | — | 3.3 | |
| xGnP C750 Graphenic carbon black[3] | | | 3.3 |
| Epon 828[1] | | | 22 |
| Epon 828/Terathane 650/ITHPA[5] | 10 | 10 | 10 |
| Dicyandiamide[7] | 5.1 | 5.1 | 5.1 |
| Diuron[8] | 0.35 | 0.35 | 0.35 |
| Calcium Oxide[9] | 3.1 | 3.1 | 3.1 |
| Wacker HDK H17[6] | 1 | 1 | 1 |
| % Graphenic Carbon Particles in total formula | 0.00% | 4.43% | 4.43% |

[7]Commercially available from ALZ CHEM
[8]Commercially available from AT .7 CHEM
[9]Commercially available from MISSISSIPPI LIME CO In these examples, Epon 828 and the graphenic carbon particles or the xGnP C750 graphenic carbon black particles (if included) were pre-mixed and roll-milled three times. The remainder of the ingredients, except the fumed silica, were added to the mixture and mixed in the SpeedMix DAC 600 FVZ for 1 minute at 2350 RPM. The fumed silica was then added to the mixture and mixed again for 1 minute at 2350 RPM. Finally, the mixture was mixed for 5-8 minutes using a low shear motor under vacuum.

The results of the theological testing of Examples 5-7 are summarized in Table 5 below and indicate that the 1K adhesive samples including graphenic carbon particles (Examples 6 and 7) exhibited higher shear thinning ratios at 45° C., improved viscosity recovery ((T3) at 17 minutes), and higher calculated Thixotropic Index than 1K adhesive samples without graphenic carbon particles. In addition, the 1K adhesive sample having graphenic carbon particles (Example 6) in accordance with the present invention exhibited similar shear thinning ratios at 25° C. and 45° C. and exhibited higher viscosity recovery ((T3) at 17 minutes) and a higher calculated Thixotropic Index than the corresponding representative adhesive samples utilizing commercially available graphenic carbon particles (Example 7).

TABLE 5

| Rheological Performance | | | |
|---|---|---|---|
| 1K Structural adhesive | Ex. 5 | Ex. 6 | Ex. 7 |
| Shear Thinning ratio @ 25° C. | 1.65 | 1.33 | 1.51 |
| Shear Thinning ratio @ 45° C. | 2.45 | 4.65 | 2.71 |
| Viscosity Recovery | Viscosity, Pa · s | | |
| 5 min. @ low shear oscillation-T1 | 69.2 | 102 | 97.8 |

TABLE 5-continued

| Rheological Performance | | | |
|---|---|---|---|
| 10 min. @ high shear rotation-T2 | 1.8 | 2.45 | 2.28 |
| 10.2 min. @ low shear oscillation-T3 | 8.82 | 85.8 | 14.1 |
| 17 min. @ low shear oscillation-T3 | 38.7 | 186 | 65.4 |
| Thixotropic Index | 1.33 | 1.88 | 1.46 |

As is apparent from the foregoing, certain 1K adhesive compositions of the present invention exhibit: (1) a shear thinning ratio at 45 degrees Celsius that is at least 20 percent greater than the shear thinning ratio at 45 degrees Celsius of a comparative adhesive composition that does not include the graphenic carbon particles; (2) a viscosity recovery that is at least 2 times greater than the viscosity recovery of a comparative adhesive composition that does not include the graphenic carbon particles; and/or (3) a Thixotropic Index that is at least 20 percent greater than the Thixotropic Index of a comparative adhesive composition that does not include the graphenic carbon particles. As used in this context, the term "comparative adhesive composition" means an adhesive composition that has the same ingredients in the same amounts as another adhesive composition to which it is being compared, with the sole exception that, in the comparative adhesive composition, the graphenic carbon particles are not present.

Whereas particular embodiments of this invention have been described above for purposes of illustration, it will be evident to those skilled in the art that numerous variations of the details of the present invention may be made without departing from the invention as defined in the appended claims.

We claim:

1. An adhesive composition comprising:
   (a) a first component;
   (b) a second component that chemically reacts with said first component; and
   (c) graphenic carbon particles comprising one or more stacked layers of one-atom-thick planar sheets of $sp^2$-bonded carbon atoms that are densely packed in a honeycomb crystal lattice having an oxygen content of no more than 2 atomic weight percent, a substantially curved, curled or buckled morphology, and a Raman spectroscopy 2D/G peak ratio of at least 1.1.

2. The adhesive composition of claim 1, wherein said graphenic carbon particles are thermally produced.

3. The adhesive composition of claim 1, wherein said graphenic carbon particles have a thickness, measured in a direction perpendicular to at least one carbon atom layer, of no more than 10 nanometers.

4. The adhesive composition of claim 1, wherein said graphenic carbon particles have an aspect ratio of greater than 3:1.

5. The adhesive composition of claim 1, wherein said graphenic carbon particles comprise from 1 to 10 weight percent of the total weight of the adhesive composition.

6. The adhesive composition of claim 1, wherein said second component chemically reacts with said first component without the need for activation from an external energy source.

7. The adhesive composition of claim 6, further comprising rubber particles having a core/shell structure.

8. The adhesive composition of claim 1, wherein a mixture comprising (a) and (c) is stored separately from (b), wherein a shear thinning ratio at 45 degrees Celsius of the mixture is at least 20 percent greater than a shear thinning ratio at 45 degrees Celsius of a comparative mixture comprising component (a) but not including (c) as measured by an Aton-Paar Physica MCR 301 Rheometer with 25 mm plate and 0.7 mm gap.

9. The adhesive composition of claim 1, wherein a mixture comprising (a) and (c) is stored separately from (b), wherein a viscosity recovery ((T3) at 17 minutes) of the mixture is at least 3 times greater than a viscosity recovery ((T3) at 17 minutes) of a comparative mixture comprising component (a) but not including (c) as measured as a function of time by an Aton-Paar Physica MCR 301 Rheometer with 25 mm plate and 0.7 mm gap.

10. The adhesive composition of claim 1, wherein a mixture comprising (a) and (c) is stored separately from (b), wherein a Thixotropic Index of the mixture is at least 25 percent greater than the Thixotropic Index of a comparative mixture comprising component (a) but not including (c) as determined by logarithmically comparing the viscosity of the adhesive sample after 7 minutes of recovery versus the viscosity of the sample as it is being applied.

11. The adhesive composition of claim 1, wherein said second component chemically reacts with said first component after mixing and upon activation from an external energy source.

12. The adhesive composition of claim 11, wherein said second component (b) comprises a heat activated latent curing agent.

13. The adhesive composition of claim 1, wherein a 0.5% by weight solution of said graphenic carbon particles in butyl cellosolve has a bulk liquid conductivity of at least 100 microSiemens as measured by a Fisher Scientific AB 30 conductivity meter.

14. A method for forming a bonded substrate comprising:
applying the adhesive composition of claim 1 to a first substrate;
contacting a second substrate to the adhesive composition such that the adhesive composition is located between said first substrate and said second substrate; and
curing the adhesive composition.

15. A coating composition comprising:
a film forming polymer; and
graphenic carbon particles comprising one or more stacked layers of one-atom-thick planar sheets of $sp^2$-bonded carbon atoms that are densely packed in a honeycomb crystal lattice having an oxygen content of no more than 2 atomic weight percent, a substantially curved, curled or buckled morphology, and a Raman spectroscopy 2D/G peak ratio of at least 1.1.

16. A coating comprising:
the cured coating composition of claim 15.

17. An adhesive comprising:
the cured adhesive composition of claim 1.

18. A method of making a composition comprising:
mixing thermally produced graphenic carbon particles and an adhesive component comprising an epoxy, wherein the graphenic carbon particles comprise one or more stacked layers of one-atom-thick planar sheets of $sp^2$-bonded carbon atoms that are densely packed in a honeycomb crystal lattice having an oxygen content of no more than 2 atomic weight percent, a substantially curved, curled or buckled morphology, and a Raman spectroscopy 2D/G peak ratio of at least 1.1.

19. The method of claim 18, wherein the thermally produced graphenic carbon particles are produced by heating at least one hydrocarbon precursor material capable of forming a two-carbon species in a thermal zone at a temperature of at least 1000° C.

20. The method of claim 18, wherein the thermally produced graphenic carbon particles are produced by heating a methane precursor material in a thermal zone at a temperature of at least 1000° C.

21. The method of claim 19, wherein the thermal zone is at a temperature of from greater than 3,500° C. to 20,000° C.

22. The method of claim 20, wherein the thermal zone is at a temperature of from greater than 3,500° C. to 20,000° C.

* * * * *